(12) United States Patent
McCune et al.

(10) Patent No.: US 8,672,801 B2
(45) Date of Patent: Mar. 18, 2014

(54) MOUNTING SYSTEM FOR A PLANETARY GEAR TRAIN IN A GAS TURBINE ENGINE

(75) Inventors: Michael E. McCune, Colchester, CT (US); Gino Pagluica, Wells, ME (US)

(73) Assignee: United Technologies Corporation, Hartford, CT (US)

( * ) Notice: Subject to any disclaimer, the term of this patent is extended or adjusted under 35 U.S.C. 154(b) by 517 days.

(21) Appl. No.: 12/627,821

(22) Filed: Nov. 30, 2009

(65) Prior Publication Data
US 2011/0130246 A1 Jun. 2, 2011

(51) Int. Cl.
*F16H 57/08* (2006.01)
(52) U.S. Cl.
USPC ............................ 475/346; 475/331; 475/347
(58) Field of Classification Search
USPC ......................................... 475/331, 346, 347
See application file for complete search history.

(56) References Cited

U.S. PATENT DOCUMENTS

| | | | |
|---|---|---|---|
| 2,591,743 A | 4/1952 | Thompson | |
| 3,352,178 A * | 11/1967 | Lindgren et al. | 475/343 |
| 3,754,484 A * | 8/1973 | Roberts | 475/344 |
| 4,084,861 A | 4/1978 | Greenberg et al. | |
| 4,265,099 A | 5/1981 | Johnson et al. | |
| 4,378,711 A | 4/1983 | Daniel | |
| 4,952,076 A | 8/1990 | Wiley, III et al. | |
| 5,088,840 A | 2/1992 | Radtke | |
| 5,391,125 A | 2/1995 | Turra et al. | |
| 5,433,674 A | 7/1995 | Sheridan et al. | |
| 5,466,198 A | 11/1995 | McKibbin et al. | |
| 5,472,383 A | 12/1995 | McKibbin | |
| 5,791,789 A | 8/1998 | VanDuyn et al. | |
| 6,223,616 B1 | 5/2001 | Sheridan | |
| 6,394,387 B1 | 5/2002 | Mitrovic | |
| 7,011,599 B2 | 3/2006 | Becquerelle et al. | |
| 7,021,042 B2 | 4/2006 | Law | |
| 7,033,301 B2 | 4/2006 | Kimes | |
| 7,153,091 B2 | 12/2006 | Stephenson et al. | |
| 7,214,160 B2 | 5/2007 | Illerhaus | |
| 7,591,754 B2 | 9/2009 | Duong et al. | |
| 7,824,305 B2 | 11/2010 | Duong et al. | |
| 7,926,260 B2 | 4/2011 | Sheridan et al. | |
| 8,205,432 B2 | 6/2012 | Sheridan | |
| 2008/0006018 A1 | 1/2008 | Sheridan et al. | |
| 2010/0105516 A1 | 4/2010 | Sheridan et al. | |

FOREIGN PATENT DOCUMENTS

| | | |
|---|---|---|
| GB | 1363151 | 8/1974 |
| JP | 06-001889 U | 1/1994 |
| JP | 2001208146 A | 8/2001 |
| JP | 2005163666 A | 6/2005 |
| JP | 2005207472 A | 8/2005 |

OTHER PUBLICATIONS

Extended European Search Report from EP Application Serial No. 10252197.8; dated Mar. 29, 2011; 5 pages.

(Continued)

*Primary Examiner* — Tisha Lewis
(74) *Attorney, Agent, or Firm* — Kinney & Lange, P.A.

(57) ABSTRACT

A mounting system for a planetary gear train in a gas turbine engine comprises a support strut, a deflection flange and a deflection limiter. The support strut extends between a stationary engine case and a rotating engine shaft that provides input to the planetary gear train in the gas turbine engine. The deflection flange extends from a rotating output component of the planetary gear train. The deflection limiter is connected to the support strut and engages the deflection flange when the gear train becomes radially displaced.

24 Claims, 2 Drawing Sheets

(56) References Cited

OTHER PUBLICATIONS

T. A. Dickey et al., "The Evolution and Development Status of the ALF 502 Turbofan Engine", Society of Automotive Engineers, Inc.; National Aerospace Engineering & Mfg. Meeting, Oct. 2-5, 1972, 15 pages.

M. Cusick, "Avco Lycoming's ALF 502 High Bypass Fan Engine", Society of Automotive Engineers, Inc.; Business Aircraft Meeting & Exposition, Apr. 7-10, 1981, 13 pages.

K. R. Fledderjon, The TFR731-5: Evolution of a Decade of Business Jet Service; Business Aircraft Meeting & Exposition, Apr. 12-15, 1983; 17 pages.

IHS Jane's, Jane's Aero-Engines, "Ivchenko-Progress D-727" (Ukraine) Feb. 7, 2007, 2 pages.

IHS Jane's, Jane's Aero-Engines, "Aviadvigatel D-110" (Russian Federation) Jun. 1, 2010, 4 pages.

IHS Jane's, Jane's Aero-Engines,"Turbomeca Aubisque" (France) Nov. 2, 2009, 4 pages.

IHS Jane's, Jane's Aero-Engines, "Rolls-Royce M45H" (United Kingdom) Feb. 24, 2010, 4 pages.

IHS Jane's, Jane's Aero-Engines, "Ivchenko-Progress AI-727M" (Ukraine) Nov. 27, 2011, 4 pages.

IHS Jane's, Jane's Aero-Engines, "Ivchenko-Progress D-436" (Ukraine) Feb. 8, 2012, 11 pages.

IHS Jane's, Jane's Aero-Engines, "Honeywell LF507" (United States) Feb. 9, 2012, 4 pages.

IHS Jane's, Jane's Aero-Engines, "Honeywell LF502" (United States) Feb. 9, 2012, 6 pages.

IHS Jane's, Jane's Aero-Engines, "Honewell TFE731" (United States) Jul. 18, 2012, 15 pages.

NASA Conference Publication 2077, "Quiet, Powered-Lift Propulsion", Conference held on Nov. 14-15, 1978, pp. 79-81.

Collections of materials relating to TFE731-LF507 engines.

Extended European Search Report, mailed Dec. 20, 2013.

* cited by examiner

MOUNTING SYSTEM FOR A PLANETARY GEAR TRAIN IN A GAS TURBINE ENGINE

BACKGROUND

The present invention is directed to shaft arrangements in gas turbine engines. In particular, the present invention relates to an overhung mounting system for planetary gear trains.

In overhung mounting systems, a shaft within a gas turbine engine is supported by bearings at or near a first end, and a load is suspended, or cantilevered, at a second end of the shaft. Alternatives to overhung mounting systems include straddle mounting systems in which both ends of the shaft are supported by bearings and the load is positioned between the bearings. In each configuration, a pair of spaced apart tapered roller bearings can be used to provide thrust reaction and shaft stiffening. Straddle mounting systems provide stability to the shaft, but typically require greater shaft lengths to support the set of roller bearings in addition to a ball bearing. In gas turbine engines used as propulsion systems for aircraft it is desirable to reduce engine length and weight, particularly in engines utilizing epicyclic gear trains that use additional axial space.

Fan drive gear systems use epicyclic gear trains to reduce the output speed of a gas turbine engine in order to drive a large diameter fan. As the bypass ratio of the engine increases, it becomes advantageous to use higher gear reduction ratios. The epicyclic gear train is then configured as a planetary gear system, rather than as a star gear system, to provide higher gear reduction ratios. Planetary gear systems are supported axially between a gas turbine engine input shaft and an output fan shaft, and radially by a ground connection to a stationary engine component. In such a configuration, as with all epicyclic gear trains, it is desirable to maintain proper alignment of the shafts in order to reduce wear in the planetary gear system. Misalignment of the input and output shafts can result in wear of gear teeth.

Various aircraft maneuvers impact alignment of gas turbine engine shafts, which induces vibration of gear trains. For example, high gravity turns or hard landing operations induce flexure of engine cases, sometimes referred to as backbone bending, that is transmitted to the gear train as a bending moment that shocks the gear teeth. It is advantageous to permit the gear train to be radially displaced a limited amount to absorb flexure without damaging the gear teeth. Thus, overhung mounting systems are typically used with epicyclic gear trains because of their ability to incorporate radial displacement with the use of flexible shafts. Overhung mounting systems, however, permit too much flexure when support bearings are moved close to the gear train in an attempt to shorten engine length. There is, therefore, a need for an axially short and radially flexible shaft mounting system suitable for use with a planetary gear system.

SUMMARY

The present invention is directed to a mounting system for a planetary gear train in a gas turbine engine. The mounting system comprises a support strut, a deflection flange and a deflection limiter. The support strut extends between a stationary engine case and a rotating engine shaft that provides input to the planetary gear train in the gas turbine engine. The deflection flange extends from a rotating output component of the planetary gear train. The deflection limiter is connected to the support strut and engages the deflection flange when the gear train becomes radially displaced.

DETAILED DESCRIPTION

Figure 1:
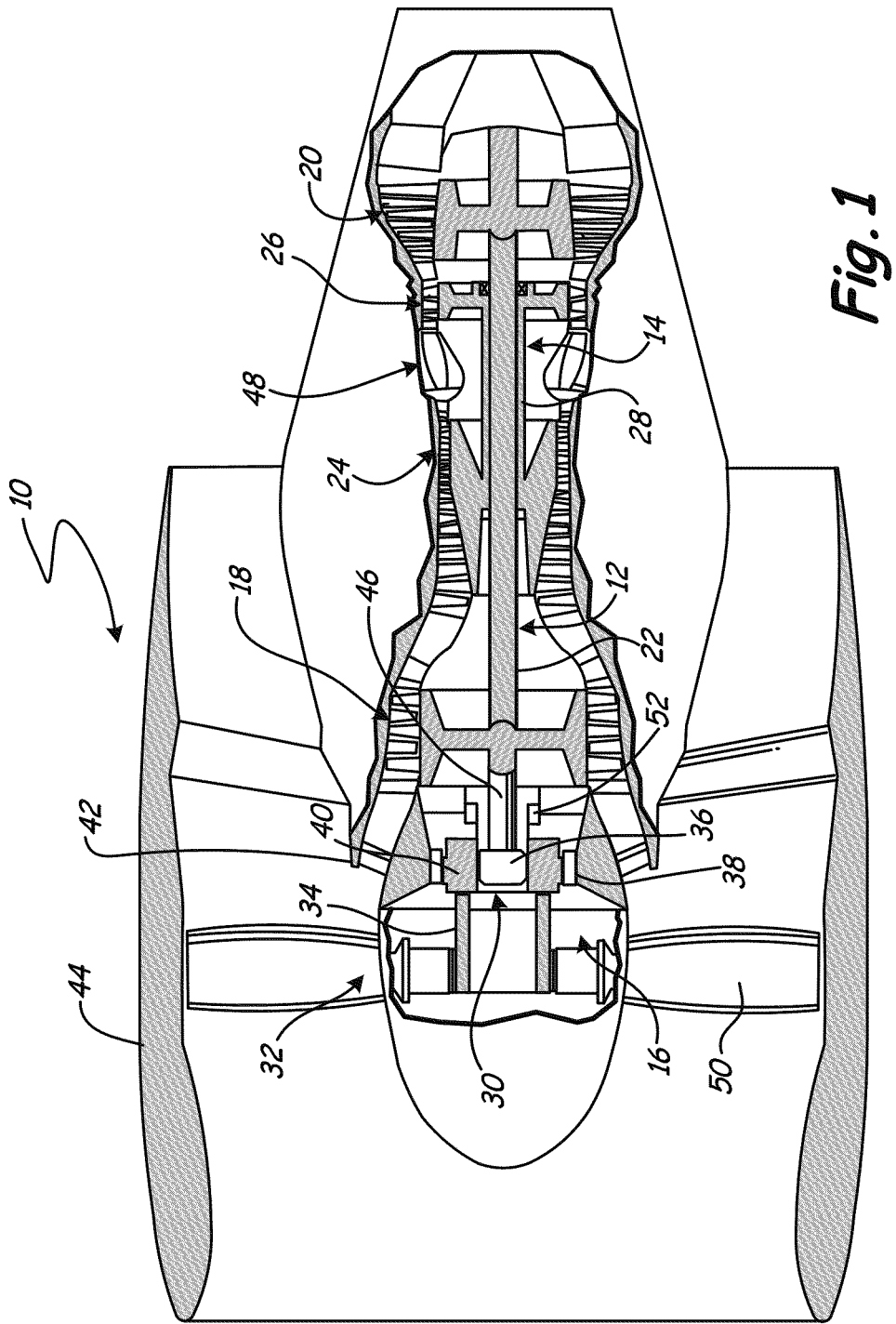
FIG. 1 shows a schematic cross-section of a gas turbine engine having a fan drive gear system.

FIG. 1 shows a schematic cross-section of gas turbine engine 10. Gas turbine engine 10 includes low pressure spool 12, high pressure spool 14 and fan drive gear system 16. Low pressure spool includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 and fan assembly 32, which are connected by fan shaft 34. Epicyclic gear train 30 includes sun gear 36, ring gear 38 and planetary gear set 40. Low pressure spool 12 and high pressure spool 14 are covered by engine nacelle 42, and fan assembly 32 and nacelle 42 are covered by nacelle 44. Low pressure spool 12, high pressure spool 20 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for compressing sequentially with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan blades 50 of fan assembly 32.

Engine 10 is configured to operate at high bypass ratios, wherein the ratio of bypass air to core air is large. Higher bypass ratios are generated by increasing the diameter of fan blades 50. Larger diameter fan blades are typically rotated at slower speeds than smaller blades to avoid performance issues related to blade tip speed, for example. Epicyclic gear train 30 is configured as a planetary gear system to provide a high gear reduction ratio between input shaft 46 and fan shaft 34. Planetary gear trains typically provide gear reduction ratios of about 3:1 or more. Epicyclic gear train 30 comprises a planetary gear system in which sun gear 36 and planetary gear set 40 rotate, while ring gear 38 remains stationary. Input shaft 46 provides rotational power to sun gear 36 of gear train 30. Planetary gear set 40, which is mounted to a carrier rack, rotates between sun gear 36 and ring gear 38 to drive fan shaft 34. Planetary gear set 40 and fan shaft 34 rotate about the centerline of engine 10 at a slower rate than sun gear 36 and input shaft 46. Fan shaft 34 drives fan assembly 32 to drive fan blades 50, which produce the bulk of the thrust generated by engine 10.

During operation of engine 10, various forces are applied to fan shaft 34, gear train 30 and input shaft 46. For example, hard turning maneuvers produced with fan blades 50 generate large gravitational forces that impart bending moments in fan shaft 34. Flexure of shaft 34 displaces gear train 30. Large displacements of gear train 30 cause misalignment between gear teeth of sun gear 36, ring gear 38 and planetary gear set 40. Epicyclic gear train 30 is coupled to engine 10 using a mounting system of the present invention to limit displacement of gear train 30, and to reduce the length of fan shaft 34. The mounting system includes deflection limiter 52 as well as other components that are described in more detail with reference to FIG. 2.

Figure 2:
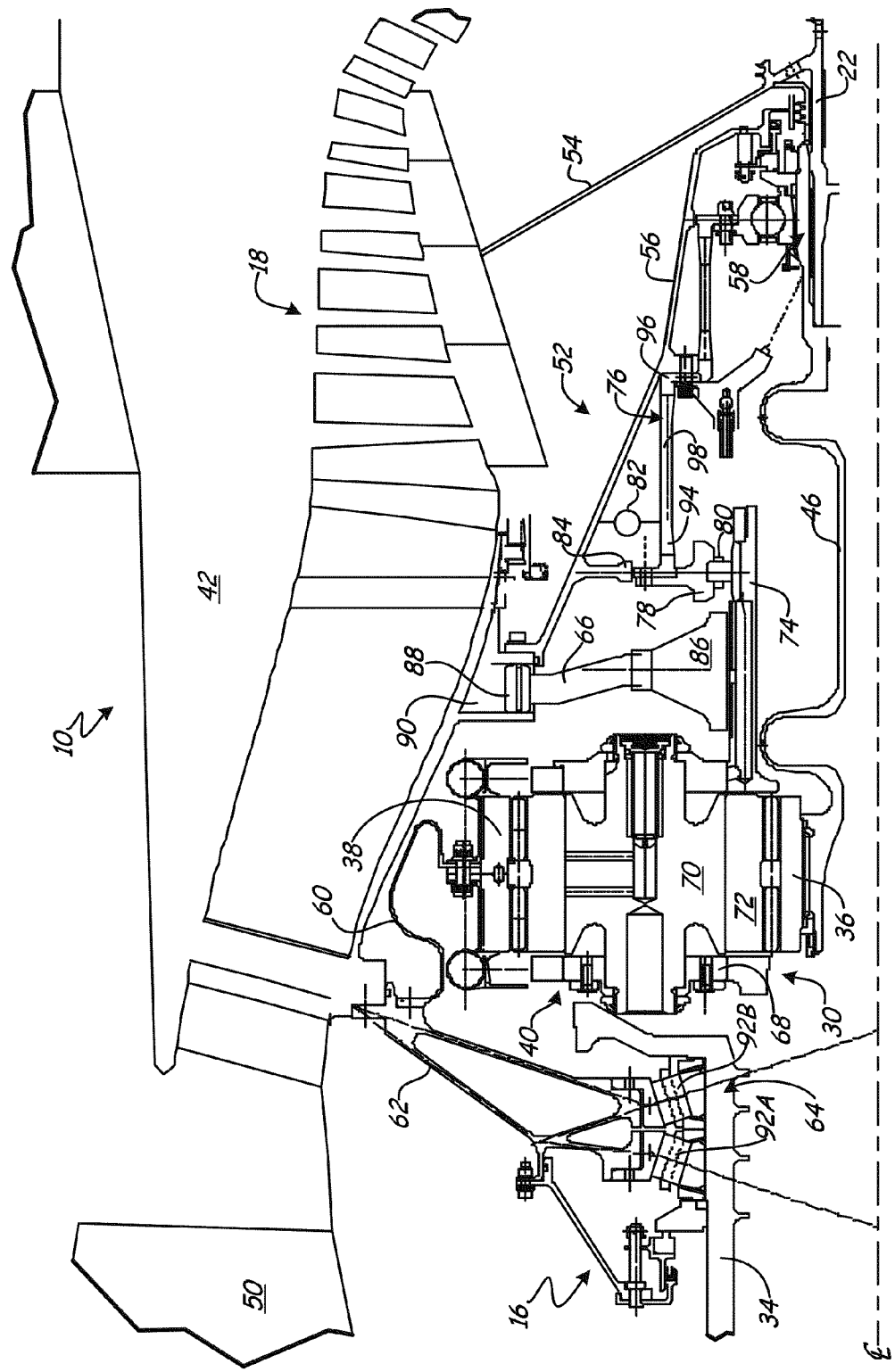
FIG. 2 shows a cross-section of a mounting system for a planetary gear train used in the fan drive gear system of FIG. 1.

FIG. 2 shows a cross-section of a mounting system for epicyclic gear train 30 used in fan drive gear system 16 of FIG. 1. Gas turbine engine 10, which is disposed about engine centerline CL, includes fan drive gear system 16, low pressure compressor 18, low pressure shaft 22, planetary gear train 30, output shaft 34, nacelle 42, input shaft 46, fan blade 50, deflection limiter 52, rotor 54, support strut 56, bearing assembly 58, flex coupling 60, support strut 62, bearing assembly 64 and distribution system 66. Planetary gear train 30 includes sun gear 36, ring gear 38, planetary gear set 40, gear carrier 68, journal bearing 70, planetary gear 72 and transfer bearing 74. Deflection limiter 52 includes drum 76, head 78, bearing 80, damper 82 and hard stop 84. Distribution system 66 includes feed tube 86, plunger 88 and collar 90.

Planetary gear train 30 is supported within engine 10 by input shaft 46, output shaft 34, and the mounting system of the present invention, which includes deflection limiter 52 and flex coupling 60. Input shaft 46 and flex coupling 60 permit planetary gear train 30 to move within nacelle 42 in order to absorb bending moments applied by output shaft 34. Deflection limiter 52 engages transfer bearing 74 to prevent gear train 30 from being displaced past a threshold level. Transfer bearing 74 also engages distribution system 66 to provide lubricating oil to gear train 30.

Low pressure shaft 22 extends from gas turbine engine 10 (FIG. 1) to drive input shaft 46. Low pressure compressor 18 is also coupled to low pressure shaft 22 by rotor 54. Low pressure shaft 22 is supported within nacelle 42 by strut 56, which connects to shaft 22 via bearing assembly 58. In the embodiment shown, bearing assembly 58 includes a ball bearing. Input shaft 46 is connected to shaft 22 at a first end, and sun gear 36 at a second end. Ring gear 38 is anchored to nacelle 42 (or an engine case for fan drive gear system 16 or low pressure compressor 18 within nacelle 42) by flex coupling 60. Thus, ring gear 38 remains stationary within nacelle 42 during operation of engine 10. Planetary gear set 40 is supported between sun gear 36 and ring gear 38 by gear carrier 68. Gear carrier 68 comprises a pair of parallel plates connected by journal bearing 70. Journal bearing 70 provides a pin upon which planet gear 72 rotates. Planetary gear set 40 includes a plurality of journal bearings 70 and planet gears 72 (only one of each is shown in FIG. 2) which are distributed around centerline CL and connected to gear carrier 68. At a first end, output shaft 34 is attached to a torque frame (not shown) having fingers that connect to gear carrier 68. At a second end, output shaft 34 connects to fan assembly 32 (FIG. 1) of fan drive gear system 16. Support strut 62 extends from nacelle 42 (or an engine case therein) to support output shaft 34 with bearing assembly 64. In the embodiment shown, bearing assembly 64 includes a pair of tapered roller bearings.

During operation of engine 10, low pressure shaft 22 rotates to drive compressor 18, which provides compressed air for combustion. The ball bearing of bearing assembly 58 accommodates rotation of shaft 22, as well as axial displacement of shaft 22, such as from thermal growth. Support strut 56 rigidly supports bearing assembly 58 such that shaft 22 is generally radially immobilized with respect to nacelle 42 near gear train 30. Input shaft 46 is coupled to shaft 22, such as by a spline, and extends generally axially from shaft 22 to connect to sun gear 36, such as by a spline. Input shaft 46 is not directly supported by bearings so as to permit displacement of gear train 30. Rotation of shaft 46 produces rotation of sun gear 36 about centerline CL. Sun gear 36 causes planet gear 72 to rotate about journal bearing 70. Engagement of planet gear 72 with ring gear 38 causes planet gear 72 to revolve around centerline CL, causing gear carrier 68 to rotate about centerline CL also. Thus, shaft 46, sun gear 36 and gear carrier 68 rotate about centerline CL, while journal bearing 70 and planet gear 72 orbit centerline CL. Rotation of gear carrier 68 causes output shaft 34 to rotate about centerline CL to drive fan blades 50. The pair of tapered roller bearing of bearing assembly 64 accommodates rotation of shaft 34, but provides resistance to axial loads, such as from thrust forces. Support strut 62 rigidly supports bearing assembly 64 such that shaft 34 is generally radially immobilized with respect to nacelle 42 near gear train 30.

Lubrication is provided to gear train 30 via distribution system 66. Feed tube 86 extends generally radially between collar 90 and transfer bearing 74. Plunger 88 rides in collar 90 at a radially outer end, and rides against a land on transfer bearing 74 at a radially inner end. Feed tube 86 is supported within engine 10 by supports (not shown). A lubricant is provided to collar 90 from a source within engine 10. The lubricant enters plunger 88 and travels through feed tube 86 to enter an axially extending bore in the land of transfer bearing 74. From transfer bearing 74 the lubricant travels into a manifold on gear carrier 68 to enter journal bearing 70, and for distribution to the gear teeth interfaces in planetary gear set 40 through various radial and axial passages. The lubricant reduces wear on and ensures adequate cooling of the gear teeth.

Operation of engine 10 produces vibration of gear train 30 through shaft 34. For example, changes in airflow across fan blade 50 generates moment stresses in shaft 34, which, if left unchecked, propagate to gear train 30. Engine 10 includes a plurality of mounting means that control vibration and displacement of gear train 30. Shafts 34 and 46 support gear train 30 axially and provide a degree of radial support that is proportional to the flexibility of the shafts, as influenced by bearing assemblies 64 and 58, respectively. Gear train 30 is also supported within engine 10 by flex coupling 60 and deflection limiter 52. Flex coupling 60 provides radial support from strut 62 during all operations of engine 10. Deflection limiter 52 engages transfer bearing 74 to provide a second radial support means during operations of engine 10 that induce high bending moments of shaft 34.

Bearing assembly 64 provides gear train 30 with a first degree of stability. Deflection of output shaft 34 is dampened by bearings 92A and 92B to reduce the amount of vibration passed on to gear train 30. Bearings 92A and 92B stiffen shaft 34 to inhibit flexure induced by bending moments from blade 50. Bearing assembly 64 is positioned close to gear train 30 to reduce the axial space occupied by fan drive gear system 16 and the length of engine 10. Furthermore, bearing 92A and 92B are close coupled such that they are positioned closer to each other than in previous designs. In one embodiment, bearings 92A and 92B are spaced apart from about 1 inch (~2.54 cm) to about 2 inches (~5.08 cm). As such, the length of fan drive gear system 16 and gear train 30 is reduced. The arrangement of bearing assembly 64 in engine 10, however, limits the ability of bearings 92A and 92B to stiffen shaft 34.

Flexible shaft 46 absorbs movement of gear train 30 imparted by shaft 34. Flexible shaft 46 allows gear train 30 to displace as shaft 34 flexes. Specifically, input shaft 46 comprises a flexible shaft that includes undulations or bends that permit flexure of the shaft. Such shafts are described in greater detail in U.S. Pat. No. 5,433,674 to Sheridan et al., which is assigned to United Technologies Corporation, Hartford, Conn. As such, shaft 46 permits gear train to move with shaft 34 to maintain proper alignment of gear teeth.

To further dampen displacement, gear train 30 is provided with direct coupling means to a stationary component within engine 10. Ring gear 38 is connected to strut 62 by flex coupling 60. Flex coupling 60 comprises a spring-like member that absorbs movement of gear train 30 and provides resistance to radial movement of gear train 30. Similar flex couplings are described in U.S. Pat. No. 6,223,616 to Sheridan, which is assigned to United Technologies Corporation, Hartford, Conn., and the aforementioned U.S. Pat. No. 5,433,674. During most operations of engine 10, bearing assembly 64, flex coupling 60 and flexible shaft 46 provide the requisite level of vibration damping and stability to gear train 30 to avoid mashing of gear teeth within gear train 30. However, severe displacement of gear train 30 from shaft 34 is undesirable, as can occur under extreme operating conditions.

Engine 10 is provided with deflection limiter 52 to dampen and limit displacement of gear train 30 under extreme conditions. Specifically, transfer bearing 74 of gear carrier 68 is configured to engage drum 76 of deflection limiter 52. Drum 76 comprises an axially extending annular barrel having first rim 94 and second rim 96, between which extend a plurality of deflectable spokes 98. As such, drum 76 resembles a cage and is sometimes referred to as a "squirrel cage." Such drums or cages are described in U.S. Pat. No. 4,084,861 to Greenberg et al., which is assigned to United Technologies Corporation, Hartford, Conn. Second rim 96 is connected to strut 56, and first rim 94 is cantilevered radially outward of transfer bearing 74. Transfer bearing 74 comprises an axially extending flange that rotates with planetary gear set 40 about engine centerline CL. Transfer bearing 74 provides a platform for engaging bearing 80 of deflection limiter 52 and receiving lubricating oil from distribution system 66. Bearing 80 is spaced from transfer bearing 74 during normal operation of engine 10 such that shaft 34 supports gear train 30 in an overhung configuration.

When shaft 34 is subject to a bending moment that causes gear train 30 to be displaced past a threshold level, bearing 80 engages transfer bearing 74. The threshold level corresponds to the magnitude of the bending moment in shaft 34 needed to displace gear train 30 the distance between bearing 80 and transfer bearing 74, which is typically set below the maximum bending moment shaft 34 is able to withstand. Damper 82 of deflection limiter 52 prevents drum 76 from deflecting too rapidly to avoid impact loading of the gear teeth in gear train 30. Damper 82 is positioned between head 78 and hard stop 84. In one embodiment, damper 82 comprises a squeeze film damper, as is described in the aforementioned U.S. Pat. No. 4,084,861. In such an embodiment, oil, such as from feed tube 86, is contained between head 78 and hard stop 84 by a pair of o-rings. As shaft 34 displaces gear train 30, spokes 98 of drum 76 deflect as transfer bearing 74 pushes bearing 80. In the embodiment shown, bearing 80 comprises a roller bearing. Damper 82 is engaged at all times while transfer bearing 74 is engaged with bearing 80. Engagement of bearing 80 with transfer bearing 74 allows output shaft 34 to resist bending movements imparted by blades 50. The amount of resistance provided by drum 76 and damper 82 can be set to vary based on different engine configurations. For example, the stiffness of drum 76 can be varied by changing the cross-section profile of spokes 98, and the amount of resistance provided by damper 82 can be varied by changing the oil pressure between the o-rings. Shaft 34 supports gear train 30 in a straddle configuration when gear train 30 is displaced beyond the threshold level and bearing 80 engages transfer bearing 74. Thus, the mounting system of the present invention shifts from an overhung mounting configuration to a straddle mounting configuration. Hard stop 84 prevents output shaft 34 from flexing beyond its maximum stress level. Hard stop 84 is disposed radially outward of head 78 and extend from strut 56.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mounting system for a planetary gear train in a gas turbine engine, the mounting system comprising:
   a support strut extending between a stationary engine case and a rotating engine shaft that provides input to the planetary gear train;
   a deflection flange extending from a rotating output component of the planetary gear train; and
   a deflection limiter comprising:
      a drum connected to the support strut, the drum engaging the deflection flange of the planetary gear train when the gear train becomes radially displaced; and
      a hard stop extending from the support strut and configured to prevent the drum from engaging the support strut when the gear train becomes radially displaced.

2. The mounting system of claim 1 wherein the planetary gear train comprises:
   a sun gear for receiving input from the engine shaft;
   a ring gear concentrically disposed about the sun gear;
   a planetary gear set disposed between the sun gear and the ring gear; and
   a gear carrier comprising the rotating output component coupled to the planetary gear set for connecting to an output shaft.

3. The mounting system of claim 1 wherein the deflection limiter comprises:
   a flexible drum comprising:
      a first end connected to the support strut; and
      a second end concentrically disposed about the deflection flange; and
   a bearing positioned between the second end and the deflection flange.

4. The mounting system of claim 3 wherein the:
   hard stop engages a radially outward surface of the second end of the flexible drum when the gear train becomes radially displaced.

5. The mounting system of claim 4 and further comprising:
   a damper positioned between the flexible drum and the support strut.

6. The mounting system of claim 5 wherein the damper comprises a squeeze film damper positioned between the second end of the flexible drum and the hard stop.

7. The mounting system of claim 3 wherein the flexible drum is a squirrel cage having:
   a first annular rim including the first end;
   a second annular rim including the second end; and a plurality of deflectable spokes extending between the first annular rim and the second annular rim.

8. The mounting system of claim 3 and further comprising:
a second support strut for extending from the engine case; and
a pair of close coupled tapered bearings mounted to the second support strut for engaging the output shaft.

9. The mounting system of claim 8 and further comprising:
a flex coupling for grounding the ring gear to the engine case.

10. An aircraft propulsion system comprising:
a gas turbine engine;
an input shaft driven by the gas turbine engine;
a planetary gear train comprising:
    a sun gear connected to the input shaft;
    a ring gear concentrically disposed about the sun gear;
    a planetary gear set disposed between the sun gear and the ring gear; and
    a rotatable gear carrier coupled to the planetary gear set;
an output shaft connecting to the gear carrier to a fan propeller;
an engine case surrounding the input shaft, gear train and output shaft; and
a flexible cantilevered deflection limiter comprising:
    a first end connected to the engine case; and
    a second end axially extending from the first end; and
an axially extending deflection flange connected to the planetary gear train and extending to be concentric with the second end of the flexible cantilevered deflection limiter;
wherein the flexible cantilevered deflection limiter is spaced from the axially extending deflection flange and is configured to engage the axially extending deflection flange when the output shaft deflects past a threshold level.

11. The propulsion system of claim 10 wherein the flexible cantilevered deflection limiter comprises:
a flexible drum; and
a bearing positioned between the second end and the deflection flange.

12. The propulsion system of claim 11 and further comprising:
a first support strut extending from the engine case to engage the input shaft at a first bearing interface; and
a second support strut extending from the engine case to engage the output shaft at a second bearing interface, the second bearing interface comprising a pair of close coupled tapered bearings.

13. The propulsion system of claim 11 and further comprising:
a damper positioned between the flexible drum and the support strut.

14. The propulsion system of claim 13 wherein the damper comprises a squeeze film damper positioned between the second end of the flexible drum and the hard stop.

15. The propulsion system of claim 11 wherein the flexible drum is a squirrel cage having:
a first annular rim including the first end;
a second annular rim including the second end; and
a plurality of deflectable spokes extending between the first annular rim and the second annular rim.

16. The propulsion system of claim 12 and further comprising:
a flex coupling connecting the engine case to the ring gear.

17. A planetary gear train for use in a gas turbine engine, the planetary gear train comprising:
a sun gear rotatable by a shaft of the gas turbine engine;
a ring gear concentrically disposed about the sun gear for grounding to a stationary engine component;
a planetary gear carrier having a plurality of planetary gears disposed between the sun gear and the ring gear such that the carrier is rotatable about the sun gear; and
a deflection limiter comprising:
    a support flange extending axially from the gear carrier;
    a flexible drum for anchoring by the stationary engine component and extending to be concentrically aligned with the support flange.

18. The planetary gear train of claim 17 and further comprising:
a bearing positioned between the support flange and the flexible drum.

19. The planetary gear train of claim 18 and further comprising a hard stop positioned between the stationary engine component and the flexible drum.

20. The planetary gear train of claim 19 and further comprising a squeeze film damper positioned between the hard stop and the flexible drum.

21. A mounting system for a planetary gear train in a gas turbine engine, the mounting system comprising:
a support strut extending between a stationary engine case and a rotating engine shaft that provides input to the planetary gear train;
a deflection flange extending from a rotating output component of the planetary gear train;
a deflection limiter connected to the support strut, the deflection limiter engaging the deflection flange of the planetary gear train when the gear train becomes radially displaced;
a feed tube configured to provide lubrication to the planetary gear train; and
a damper positioned between the deflection limiter and the support strut, the damper configured to receive lubricant from the feed tube.

22. A mounting system for a planetary gear train in a gas turbine engine, the mounting system comprising:
a support strut extending between a stationary engine case and a rotating engine shaft that provides input to the planetary gear train;
a deflection flange extending from a rotating output component of the planetary gear train;
a deflection limiter connected to the support strut, the deflection limiter engaging the deflection flange of the planetary gear train when the gear train becomes radially displaced; and
a bearing mounted to the deflection flange and spaced from the deflection limiter such that the deflection limiter engages the bearing when the gear train becomes radially displaced.

23. A mounting system for a planetary gear train in a gas turbine engine, the mounting system comprising:
a support strut extending between a stationary engine case and a rotating engine shaft that provides input to the planetary gear train;
a deflection flange extending from a rotating output component of the planetary gear train; and
a deflection limiter connected to the support strut, the deflection limiter engaging the deflection flange of the planetary gear train when the gear train becomes radially displaced;
wherein the deflection flange comprises a transfer bearing for a lubrication system coupled to the planetary gear train.

24. A mounting system for a planetary gear train in a gas turbine engine, the mounting system comprising:
- a support strut extending between a stationary engine case and a rotating engine shaft that provides input to the planetary gear train;
- a deflection flange extending from a rotating output component of the planetary gear train; and
- a deflection limiter connected to the support strut, the deflection limiter engaging the deflection flange of the planetary gear train when the gear train becomes radially displaced;
- wherein the deflection limiter comprises a flexible drum comprising:
  - a first end connected to the support strut, the first end comprising a first annular rim;
  - a second end concentrically disposed about the deflection flange, the second end comprising a second annular rim; and
  - a plurality of deflectable spokes extending between the first annular rim and the second annular rim.

* * * * *